US006677556B1

United States Patent
Huang

(10) Patent No.: US 6,677,556 B1
(45) Date of Patent: Jan. 13, 2004

(54) INNER POT OF AN ELECTRIC FRYER

(75) Inventor: Chin-Yi Huang, Tainan Hsien (TW)

(73) Assignee: Ya Horng Electronic Co., Ltd., Tainan Hsien (TW)

( * ) Notice: Subject to any disclaimer, the term of this patent is extended or adjusted under 35 U.S.C. 154(b) by 0 days.

(21) Appl. No.: 10/281,211

(22) Filed: Oct. 28, 2002

(51) Int. Cl.$^7$ ................................................ A47J 37/12
(52) U.S. Cl. .......................... 219/438; 219/439; 99/403
(58) Field of Search ................................ 219/438, 439, 219/430, 432, 433; 99/403, 408

(56) References Cited

U.S. PATENT DOCUMENTS 4,691,096 A * 9/1987 Knauss ........................ 99/403

FOREIGN PATENT DOCUMENTS

CA 1239544 * 7/1988
FR 2507461 * 12/1982

* cited by examiner

Primary Examiner—Joseph Pelham
(74) Attorney, Agent, or Firm—Bacon & Thomas, PLLC

(57) ABSTRACT

The inner pot of an electric fryer includes an annular electric heating tube at the bottom. Two ends of the electric heating tube are separated from each other, forming there between a gap that forms the coolest section of the inner circumference at the bottom of the inner pot. An oil gathering groove is provided at the coldest section and communicates with the bottom center of the inner pot by means of an oil passage passing through the gap between the two ends of the electric heating tube. The inner pot is designed to have a bottom slanting downward toward the oil-gathering groove after combined with an outer pot. Thus, the remaining oil in the inner pot is able to flow into the oil gathering groove along the inner wall and through the oil passage to prevent remaining oil inside from accumulating near the electric heating tube and catching fire.

1 Claim, 5 Drawing Sheets

INNER POT OF AN ELECTRIC FRYER

BACKGROUND OF THE INVENTION

This invention relates to the inner pot of an electric fryer, particularly to one able to let the remaining oil attaching on the inner wall and the bottom of an inner pot flow into an oil gathering groove after the surplus oil in the inner pot is poured out to prevent the remaining oil in an inner pot from accumulating around an electric heating tube and catching fire.

A conventional electric fryer includes an inner and an outer pot, which are either detachable or inseparable. The inner pot 10 of a conventional electric fryer, as shown in FIG. 1, has its level bottom provided with an annular projection 101 with its ends separated from each other and having an electric heating tube 102 extended therein. The inner pot 10 further has its bottom center formed with a round recess 103 surrounded by the annular projection 101, as shown in FIG. 2. The outer pot 20 of the conventional electric fryer is provided with a temperature control device (not shown) for adjusting and controlling temperature of the electric heating tube 102 and an overheat protective device (not shown), which is able to cut off electricity automatically when the temperature of the electric heating tube 102 exceeds a heat value preset by the temperature control device.

In using, pour a proper amount of oil into the inner pot 10 and adjust the temperature control device of the outer pot 20 and then turn on the electric heating tube 102 to heat the oil in the inner pot 10 to carry out frying food, and after finishing frying, the surplus oil in the inner pot 10 is poured out.

However, oil is thick and sticky, therefore after the oil in the inner pot 10 is poured out, the remaining oil inside always accumulates near the electric heating tube 102 at the bottom of the inner pot 10. Under the circumstances, when the inner pot 10 recovers its level position and if a user operates improperly or the temperature control device is not cut off, the electric heating tube 102 will continue to heat the inner pot 10 and make the temperature of the accumulated oil near the electric heating tube 102 rise fast. At this time, in case the overheat protective device cannot automatically cut off the electricity of the electric fryer in time, the accumulated oil around the electric heating tube 102 may catch fire, not only possible to burn up the electric fryer, but even likely to give rise to a fire as well. Evidently, remaining oil accumulated near the electric heating tube 102 at the bottom of the inner pot 10 may be the main cause of a fire. In other words, so long as there is no remaining oil accumulated in the inner pot 10 near the electric heating tube 102 and the overheat protective device can be controlled, a fire will not happen.

SUMMARY OF THE INVENTION

The objective of this invention is to offer the inner pot of an electric fryer, able to prevent remaining oil in an inner pot from accumulating near an electric heating tube at the bottom of the inner pot and avoid burning of oil therein.

The inner pot of an electric fryer in the present invention is provided at the bottom with an electric heating tube having two ends separated from each other to form therein a gap, which forms the coolest section around the inner circumference at the bottom of the inner pot. The feature of the invention is an oil gathering groove provided at the coolest section at the bottom of the inner pot and an oil passage positioned between and communicating with the oil gathering groove and the bottom center of the inner pot. The oil passage passes through the gap between the two ends of the electric heating tube, and the inner pot is designed to have a bottom slanting downward toward the oil gathering groove after combined with an outer pot. Thus, the remaining oil in the inner pot can flow into the oil gathering groove along the inner wall and through the oil passage at the bottom of the inner pot to prevent remaining oil from accumulated near the electric heating tube.

BRIEF DESCRIPTION OF DRAWINGS

This invention will be better understood by referring to the accompanying drawings, wherein.

DETAILED DESCRIPTION OF THE PREFERRED EMBODIMENT

A preferred embodiment of an electric fryer in the present invention includes an inner pot 1 to be placed in an outer pot 2, and the both are either detachable or inseparable.

Figure 1:
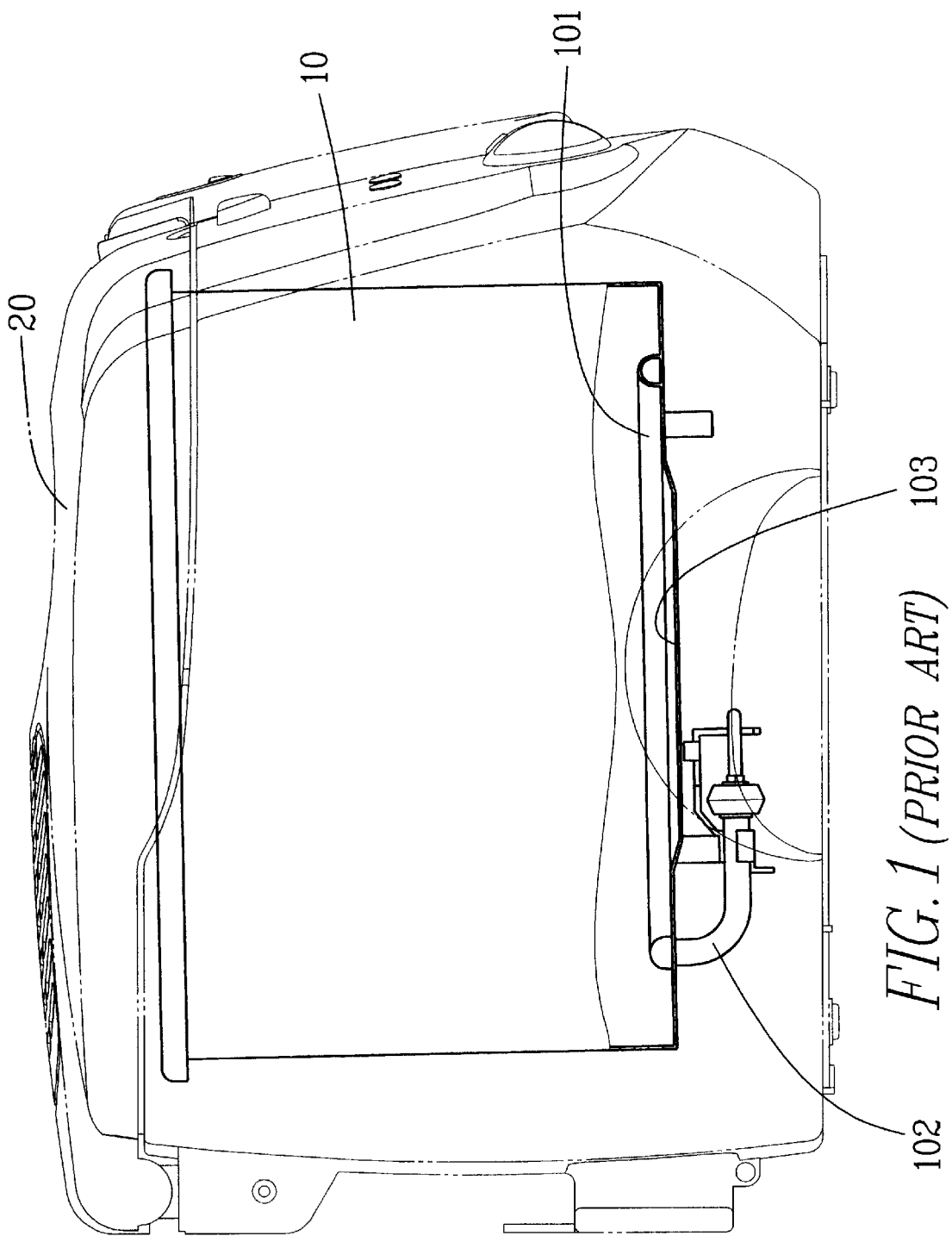
FIG. 1 is a cross-sectional view of a conventional electric fryer.
Figure 2:
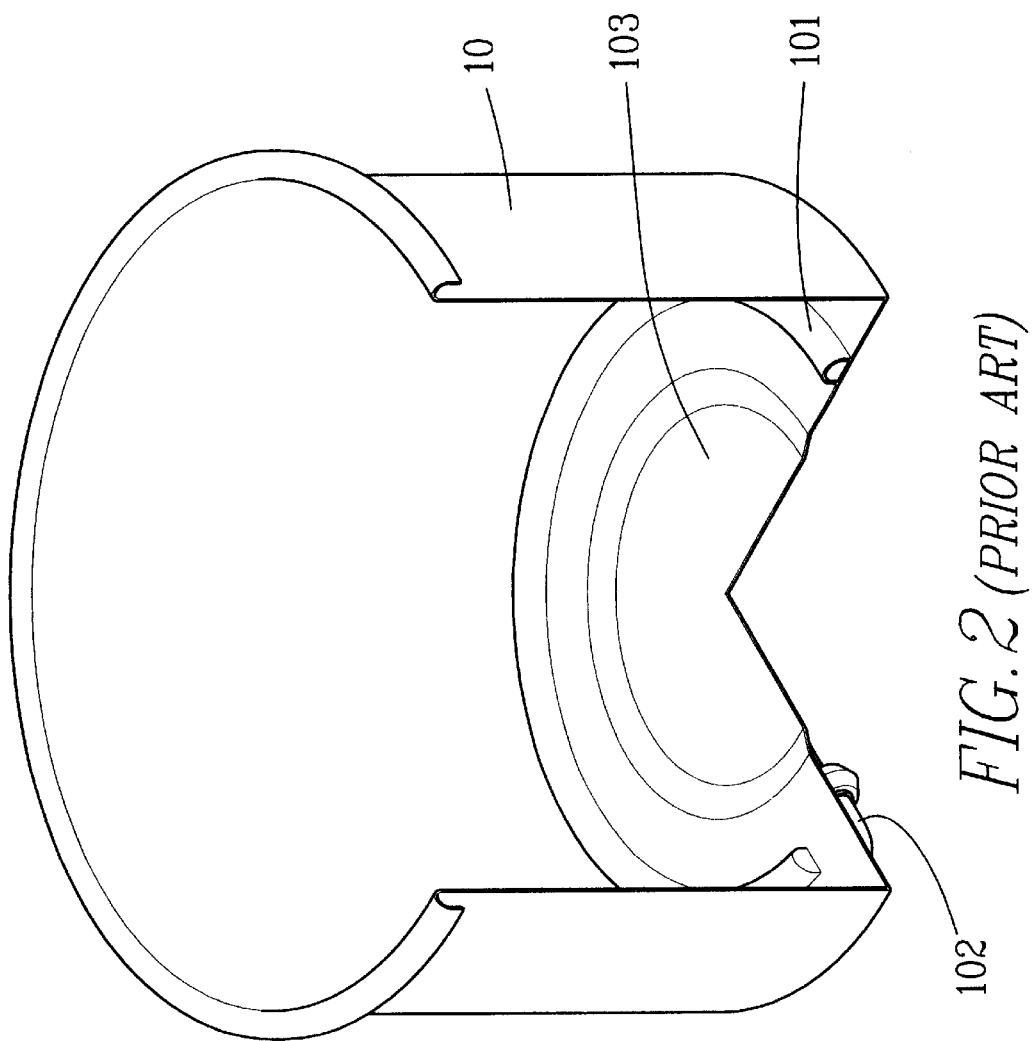
FIG. 2 is a cross-sectional view of the inner pot of the conventional electric fryer.
Figure 3:
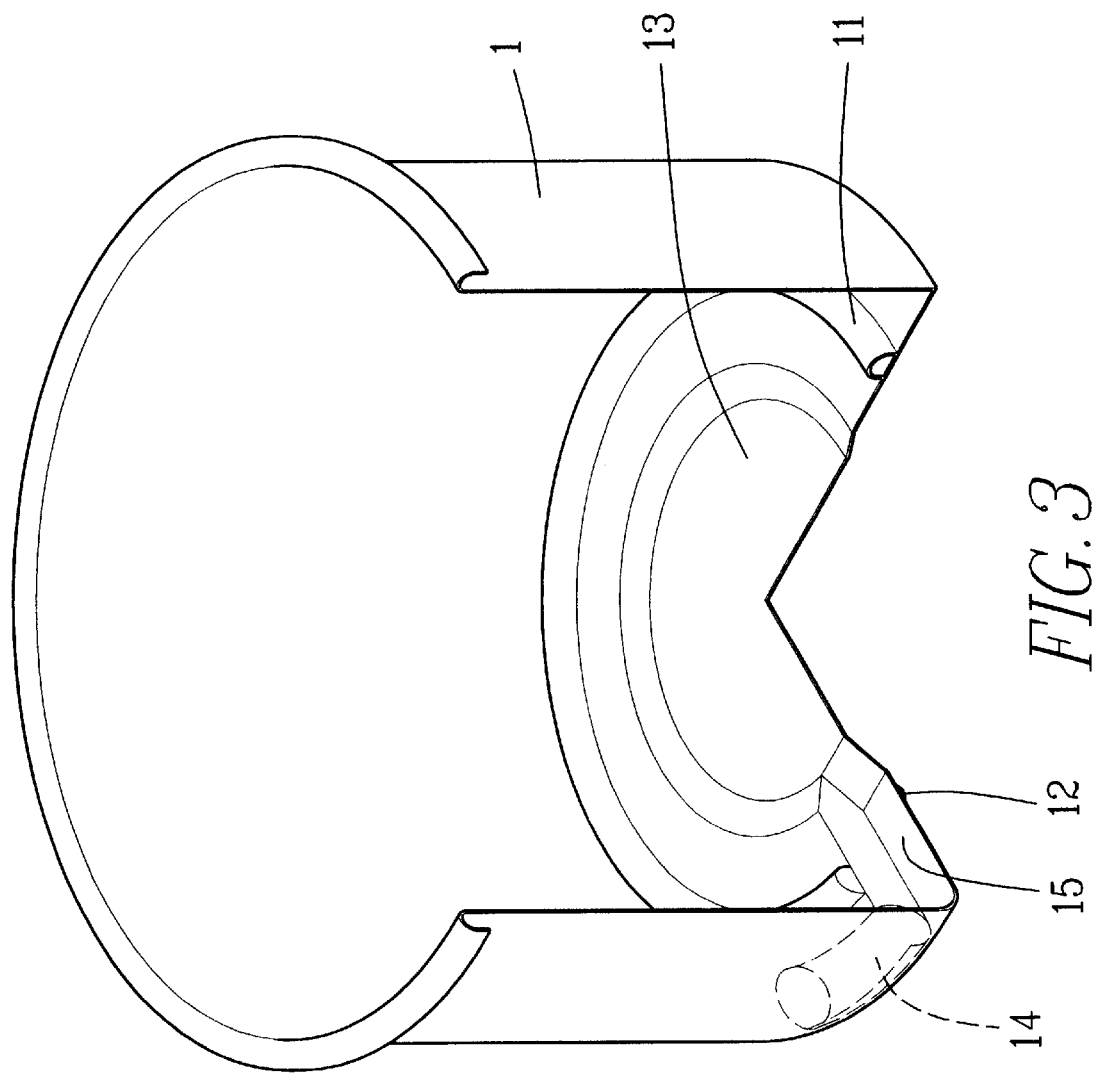
FIG. 3 is a cross-sectional view of the inner pot of an electric fryer in the present invention.
Figure 4:
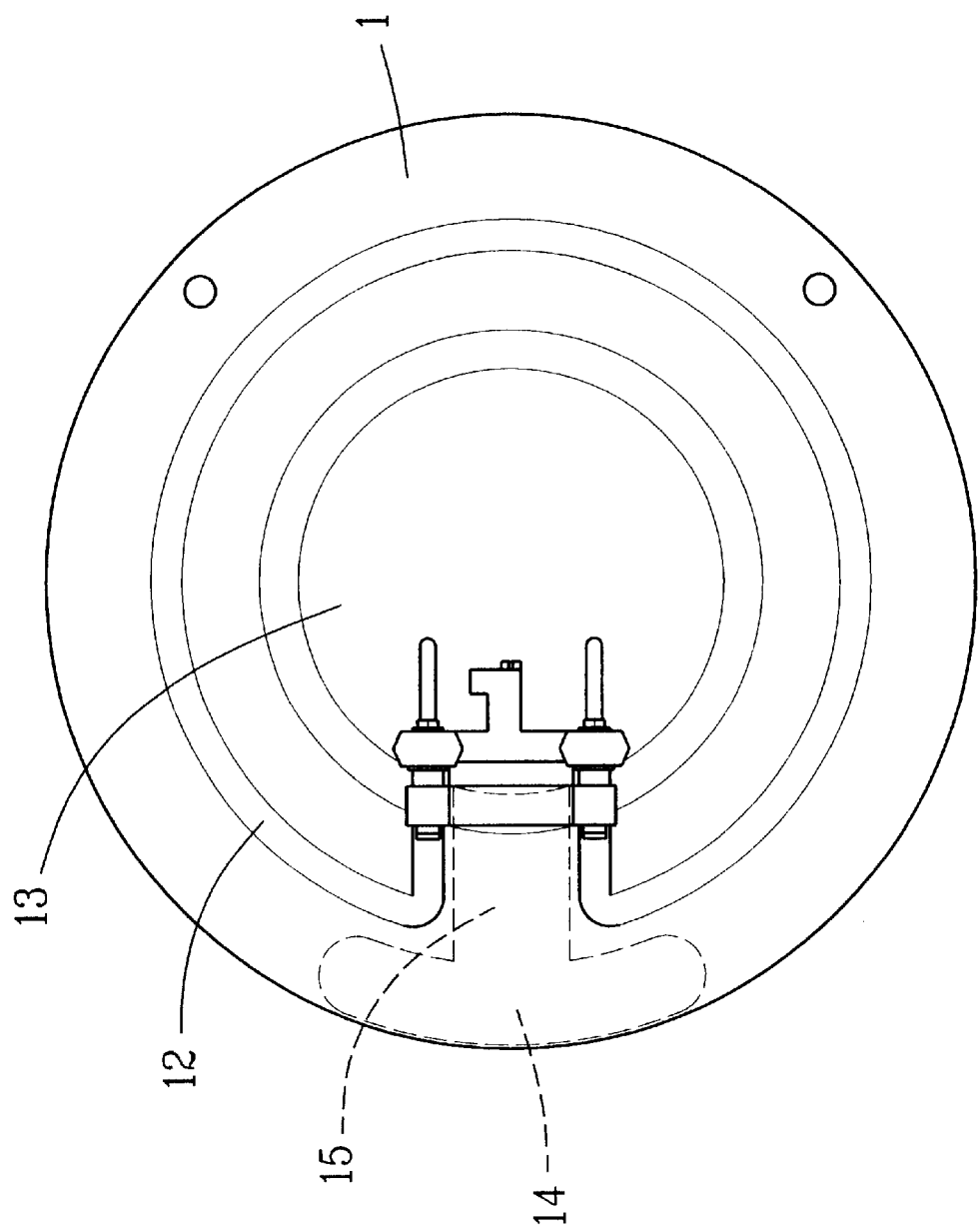
FIG. 4 is a lower view of the inner pot of the electric fryer in the present invention.

The inner pot 1, as shown in FIG. 3, is provided at the bottom with an annular tubular projection 11 bulging up and having its two ends separated from each other. An electric heating tube 12 is arranged to extend in the annular tubular projection, with two ends of the projection 11 together with the ends of the electric heating tube 12 respectively separated from each other to form a gap therebetween. The gap having no electric heating tube 12 installed therein forms the coolest section around the inner circumference at the bottom of the inner pot 1. The inner pot 1further has its bottom center formed with a round recess 13 surrounded by the annular tubular projection 11 together with the electric heating tube 12. Besides, an oil gathering groove 14 is provided at the coolest section at the inner side of the inner pot 1 and communicates with the round recess 13 at the bottom center of the inner pot 10 by means of a recessed oil passage 15 passing through the gap between the two ends of the annular tubular projection 11 together with the electric heating tube 12, as shown in FIG. 4. In addition, the inner pot 1is designed to have a bottom slanting downward toward the oil-gathering groove 14 when the inner and the outer pot 1 and 2 are combined together, as shown in FIG. 5.

Figure 5:
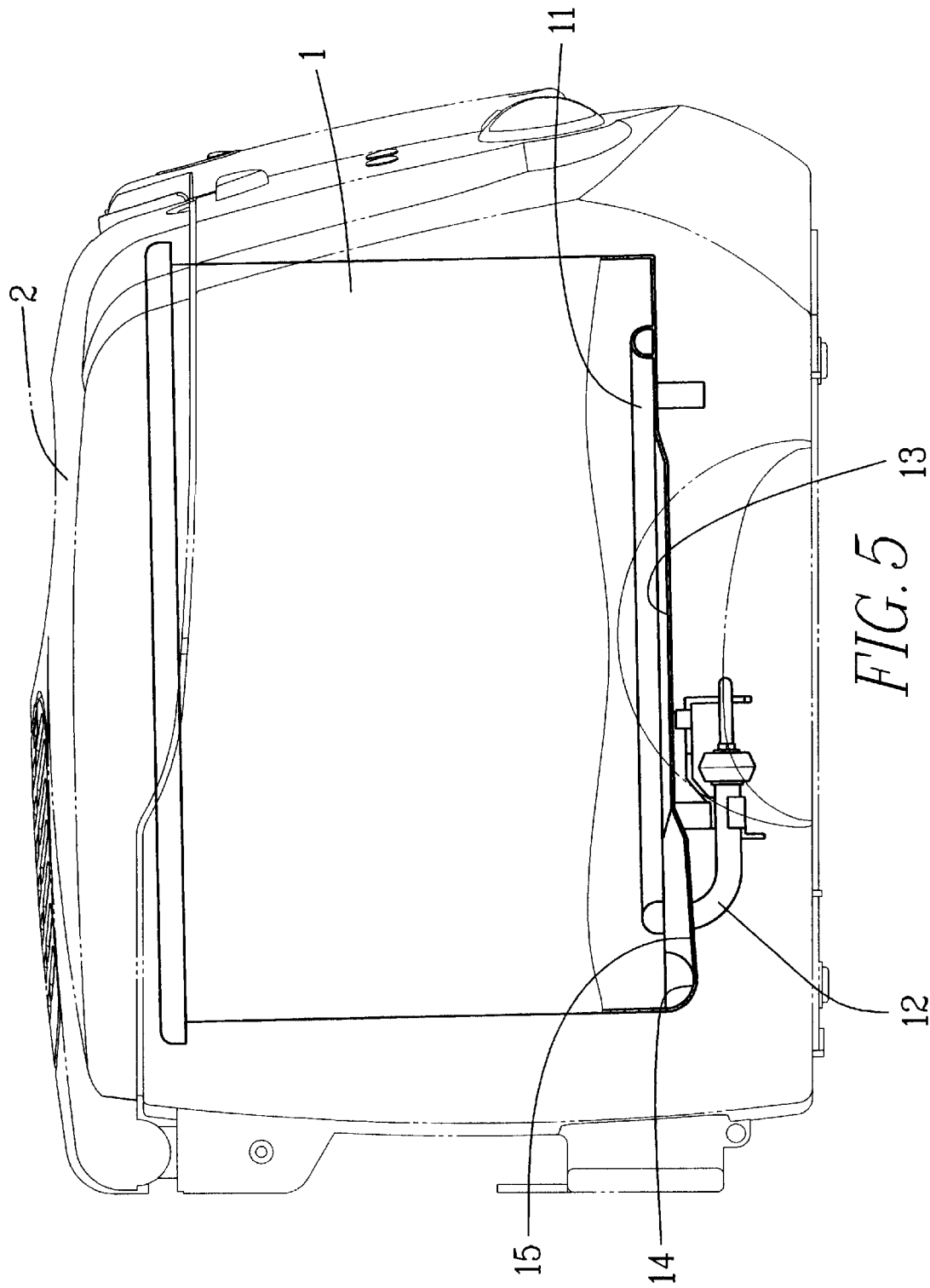
FIG. 5 is a cross-sectional view of the inner pot of the electric fryer in a used condition in the present invention.

Thanks to such a design of the inner pot 1, after. the surplus oil in the inner pot 1 is poured out and the inner pot 1recovers its level position, as shown in FIG. 5, the remaining oil attaching on the inner wall and the bottom of the inner pot 1will flow into the oil gathering groove 14 along the inner wall and the slanting bottom of the inner pot 1 and may not accumulate around the electric heating tube 12. Thus, even if a user operates improperly to let the electric heating tube 12 keep on heating, it is possible to delay rising of the temperature of the accumulated oil in the oil gathering groove 14 and, before the accumulated oil catches fire, electricity is to be cut off by the overheat protective device to let the electric heating tube 12 stop heating, able to ensure safety in use.

While the preferred embodiment of the invention has been described above, it will be recognized and understood that various modifications may be made therein and appended claims are intended to cover all such modifications that may fall within the spirit and scope of the invention.

I claim:

1. An inner pot of an electric fryer comprising an annular electric heating tube provided at its bottom, said electric heating tube having its two ends separated from each other by a gap formed therebetween, said gap forming the coolest section of the inner circumference at the bottom of said inner pot: and, Characterized by an oil gathering groove provided at the coolest section at the bottom of said inner pot, said oil gathering groove communicating with the bottom center of said inner pot by means of an oil passage passing through said gap between the two ends of said electric heating tube, said inner pot designed to have a bottom slanting downward toward said oil gathering groove after combined with an outer pot, the remaining oil in said inner pot able to flow into said oil gathering groove along the inner wall of said inner pot and through said oil passage, said remaining oil in said inner pot impossible to accumulate near said electric heating tube, ensuring safety in use.

* * * * *